US012725461B2

(12) United States Patent
Lerner

(10) Patent No.: US 12,725,461 B2
(45) Date of Patent: Sep. 1, 2026

(54) SYSTEMS AND METHODS FOR VERIFYING VEHICLE DATA

(71) Applicant: Toyota Jidosha Kabushiki Kaisha, Aichi-ken (JP)

(72) Inventor: Emily Lerner, Ypsilanti, MI (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 18/491,127

(22) Filed: Oct. 20, 2023

(65) Prior Publication Data

US 2025/0131774 A1 Apr. 24, 2025

(51) Int. Cl.
*G07C 5/00* (2006.01)
*B60W 60/00* (2020.01)

(52) U.S. Cl.
CPC ........... *G07C 5/008* (2013.01); *B60W 60/001* (2020.02)

(58) Field of Classification Search
CPC .... G07C 5/008; B60W 60/001; G06F 18/232; G06F 18/23; G01C 21/3841
See application file for complete search history.

(56) References Cited

U.S. PATENT DOCUMENTS

| | | | | |
|---|---|---|---|---|
| 8,301,318 | B2 | 10/2012 | Lacaze et al. | |
| 9,172,398 | B2 | 10/2015 | Miyazaki | |
| 10,796,572 | B2 * | 10/2020 | Farr | G01C 21/3848 |
| 10,846,534 | B1 * | 11/2020 | Furlan | G06T 7/90 |
| 10,871,777 | B2 | 12/2020 | Jensen et al. | |
| 11,249,474 | B2 | 2/2022 | Magzimof et al. | |
| 11,470,245 | B2 | 10/2022 | Dewhurst et al. | |
| 2009/0138497 | A1 * | 5/2009 | Zavoli | G01C 21/3819 707/999.102 |
| 2015/0109145 | A1 * | 4/2015 | Marathe | G07C 5/0808 340/901 |
| 2017/0355370 | A1 * | 12/2017 | Tsumori | G06F 16/219 |
| 2018/0188037 | A1 * | 7/2018 | Wheeler | G06V 20/582 |
| 2019/0266295 | A1 | 8/2019 | Masuda et al. | |
| 2020/0209852 | A1 * | 7/2020 | Soryal | H04W 4/024 |
| 2020/0276977 | A1 * | 9/2020 | Saleh | B60W 50/0098 |
| 2021/0070311 | A1 * | 3/2021 | Patychuk | B60W 50/035 |
| 2021/0349460 | A1 | 11/2021 | Huang et al. | |

(Continued)

FOREIGN PATENT DOCUMENTS

| | | | | |
|---|---|---|---|---|
| CN | 114812573 A | * | 7/2022 | G01C 21/28 |

*Primary Examiner* — Erin M Piateski
*Assistant Examiner* — Ashley Tiffany Schoech
(74) *Attorney, Agent, or Firm* — DINSMORE & SHOHL LLP

(57) ABSTRACT

Systems and methods for verifying vehicle data are disclosed. In one aspect, a method includes clustering a plurality of vehicle types into a plurality of vehicle clusters based at least in part on vehicle characteristics, receiving vehicle data from a vehicle, assigning the vehicle to an individual vehicle cluster of the vehicle clusters, determining one or more digital twins also assigned to the individual cluster, comparing the vehicle data of the vehicle with vehicle data associated with the one or more digital twins, verifying the vehicle data when there is no discrepancy between the vehicle data of the vehicle and the vehicle data associated with the one or more digital twins, and adjusting the vehicle data when there is a discrepancy between the vehicle data of the vehicle and the vehicle data associated with the one or more digital twins.

16 Claims, 6 Drawing Sheets

(56) References Cited

U.S. PATENT DOCUMENTS

| | | | | |
|---|---|---|---|---|
| 2022/0180673 | A1* | 6/2022 | Abraham ............... | F02M 26/02 |
| 2022/0355839 | A1 | 11/2022 | Boucher et al. | |
| 2023/0063601 | A1* | 3/2023 | Upadhyay ............. | G07C 5/006 |

* cited by examiner

SYSTEMS AND METHODS FOR VERIFYING VEHICLE DATA

BACKGROUND

Aggregated real-world driving data can be useful to determine, for example, road conditions and route availability. Autonomous vehicles may use this data to plan and traverse a driving route. It may be important that the system analyzing the data be able to identify erroneous data collected from vehicles. Erroneous data may lead to undesirable and/or uncertain vehicular actions. Erroneous data may be generated for any number of reasons, such as sensor error or failure, or a communication error where sensor data is lost during transmission.

Accordingly, alternative methods for ensuring the accuracy of vehicle data are desired.

BRIEF SUMMARY

In one aspect, a method includes clustering a plurality of vehicle types into a plurality of vehicle clusters based at least in part on vehicle characteristics, receiving vehicle data from a vehicle, assigning the vehicle to an individual vehicle cluster of the vehicle clusters, determining one or more digital twins also assigned to the individual cluster, comparing the vehicle data of the vehicle with vehicle data associated with the one or more digital twins, verifying the vehicle data when there is no discrepancy between the vehicle data of the vehicle and the vehicle data associated with the one or more digital twins, and adjusting the vehicle data when there is a discrepancy between the vehicle data of the vehicle and the vehicle data associated with the one or more digital twins.

In another aspect, a method includes generating vehicle data by a plurality of vehicle sensors of a vehicle, transmitting the vehicle data to a computing device, receiving verified vehicle data from the computing device, wherein the computing device verifies the vehicle data from vehicle data associated with one or more digital twins assigned to a same vehicle cluster as the vehicle, and autonomously controlling at least one vehicle function of the vehicle based on the verified vehicle data.

In another aspect, a system includes one or more processors. The system also includes a non-transitory computer-readable memory storing instructions that, when executed by the one or more processors, causes the one or more processors to cluster a plurality of vehicle types into a plurality of vehicle clusters based at least in part on vehicle characteristics, receive vehicle data from a vehicle, assign the vehicle to an individual vehicle cluster of the vehicle clusters, determine one or more digital twins also assigned to the individual cluster, compare the vehicle data of the vehicle with vehicle data associated with the one or more digital twins, verify the vehicle data when there is no discrepancy between the vehicle data of the vehicle and the vehicle data associated with the one or more digital twins, and adjust the vehicle data when there is a discrepancy between the vehicle data of the vehicle and the vehicle data associated with the one or more digital twins.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments of the present disclosure are directed to systems and methods that verify vehicle data generated by a fleet of vehicles by eliminating or correcting erroneous vehicle data. Modern vehicles use significant data to perform various functions. Autonomous vehicles in particular utilize data from many sources such that the autonomous vehicles may navigate an environment without user control or intervention.

Vehicles include a plurality of sensors that generate vehicle data that is used by the vehicle to perform vehicle functions. Non-limiting example sensors include speedometer, accelerometer, camera sensor, proximity sensor, lidar sensor, steering wheel position sensor, global positioning sensor (GPS), and/or the like. An autonomous vehicle may use the vehicle data generated by these sensors to autonomously navigate from point A to point B.

It may be advantageous to collect and utilize vehicle data from a plurality of vehicles due to the increased accuracy of aggregated vehicle data. For example, one-hundred vehicles traveling along a stretch of road over a period of time may more accurately report the environment than a single vehicle traveling over the same stretch of road. Sensors may produce erroneous data for any number of reasons. Unexpected data can be the result of an actual road condition (i.e., valid data) or a result of a sensor or communication error (i.e., invalid data). A sensor of an ego vehicle generating erroneous data may undesirably impact the operation of the vehicle.

As described in more detail below, embodiments of the present disclosure compare vehicle data generated among similar vehicle types. It is to be expected that similar vehicle types produce similar vehicle data. As a non-limiting example, a two vehicles having the same make, model and year may produce similar camera data whereas two vehicle of different make, model and/or year may produce different camera due to factors such as location of the cameras on the vehicle, camera resolution, camera frame rate and the like. Thus, by comparing vehicle data amongst similar vehicles, data accuracy can be improved.

In the embodiments, vehicles sharing vehicle characteristics are clustered into a plurality of vehicle clusters. Thus, vehicles with similar capabilities are grouped within a cluster. Incoming vehicle data from vehicles within the vehicle clusters are compared with one another to determine if there are any discrepancies. Where there are discrepancies, the vehicle data is either corrected or eliminated. Once verified, the vehicle data may be sent back to individual vehicles for use in navigating the environment, such as for autonomous vehicle operation.

Figure 1:
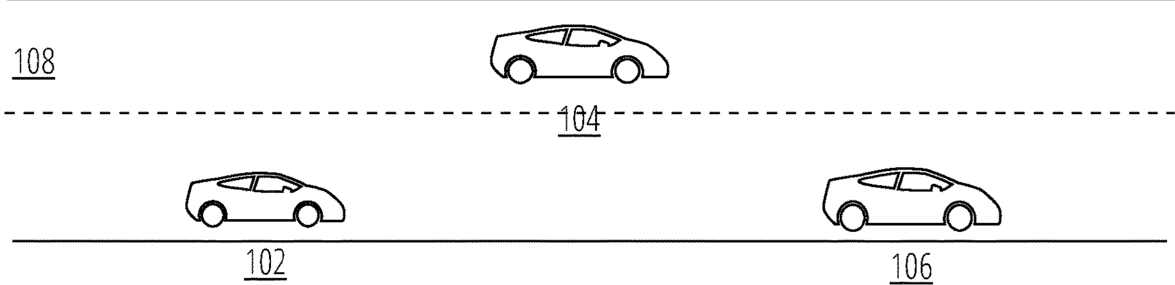
FIG. 1 illustrates an environment including three vehicles traversing a road according to one or more embodiments described and illustrated herein.

Referring now to FIG. 1, three vehicles (vehicle 102, vehicle 104 and vehicle 106) are illustrated as driving in the same direction on a road 108. Each of these vehicles have a sensor suite comprising a plurality of sensors that collectively produce vehicle data as the vehicle traverses the road 108. The vehicles may have different sensors and different sensor capabilities, or similar sensors and similar sensor capabilities. For example, vehicle 102 and vehicle 106 may have one or more of the same vehicle make, vehicle model, vehicle year and vehicle trim level. Vehicle trim level refers to the type and number of options a vehicle has. In many cases, a higher trim level has greater capabilities, often in the form of more and/or advanced sensors.

Because vehicle 102 and vehicle 106 are similar, they have similar vehicle characteristics. Accordingly, it is to be expected that both vehicle 102 and vehicle 106 produce similar vehicle data as they traverse the road 108 during a period of time. For example, the cameras of the respective vehicles are expected to produce similar camera data in the form of resolution, camera placement on the vehicle, frame rate and/or the like. As a non-limiting example, vehicle 102 and vehicle 106 may be sedans having a particular vehicle make, vehicle model, and vehicle year, whereas vehicle 104 may be a sedan of a different manufacture and year. Other types of vehicles may also be on the road, such as trucks and sport utility vehicles, for example. These vehicles are different from vehicle 102 and vehicle 106, and therefore have different vehicle characteristics.

Figure 2:
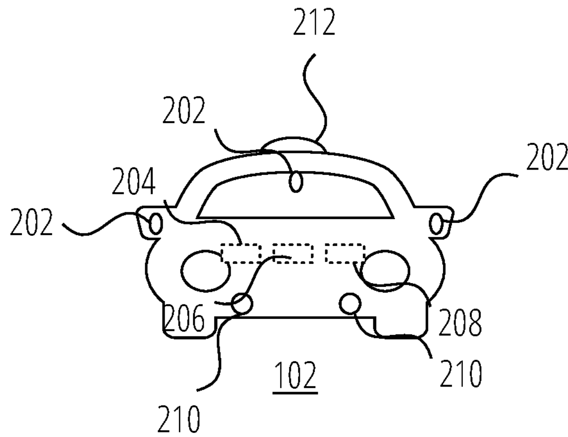
FIG. 2 illustrates an example vehicle having a plurality of sensors according to one or more embodiments described and illustrated herein.

Referring now to FIG. 2, example vehicle 102 is schematically illustrated to show various sensors. It should be understood that FIG. 2 is for illustrative purposes only, and vehicle 102 may have different sensors than what is shown in FIG. 2. Vehicle 102 has a plurality of camera sensors 202 in various locations, such as on the side mirrors, in the windshield, on the side of the vehicle body, in the rear, and/or the like. The camera sensors 202 produce video data used by the vehicle for vehicle functions, such as obstacle avoidance or autonomous driving. Vehicle 102 has proximity sensors 210 in its front as well as its rear that detect the proximity of the vehicle to an object. The proximity sensors 210 may be infrared sensors, for example. Vehicle 102 further includes a lidar sensor 212 that produces lidar signals to detect objects within the environment by way of a point cloud. Additional sensors include a speedometer 204, an inertial measurement unit 206 (IMU) such as an accelerometer, and a GPS sensor 208. It should be understood that other sensors may also be provided, such as a steering wheel position sensor and a radar sensor.

The sensor suite collectively produce vehicle data as the vehicle traverses the environment, such as on the road 108.

Figure 3:
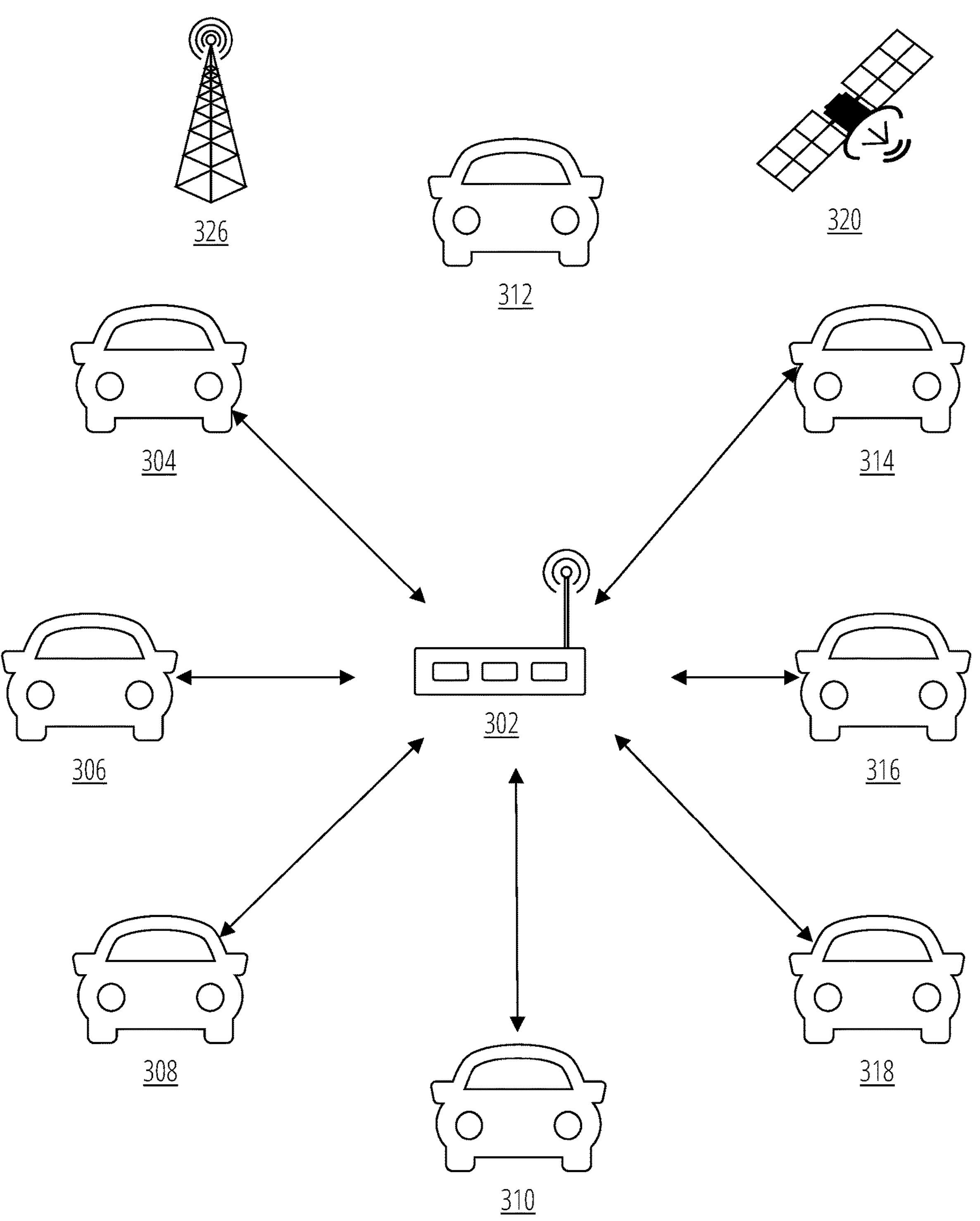
FIG. 3 illustrates a plurality of vehicles providing vehicle data according to one or more embodiments described and illustrated herein.

Referring now to FIG. 3, a plurality of vehicles (represented by vehicles 304, 306, 308, 310, 312, 314, 316, and 318) send and receive the vehicle data to one or more remote servers 302 by way of communication networks (e.g., satellite networks 320, cellular networks 326, vehicle-to-vehicle networks, vehicle-to-infrastructure networks, and/or other wireless communication networks). There may be thousands or millions of vehicles contributing vehicle data to the remote servers 302 which, as described in more detail below, verify the vehicle data so that it may be sent to the plurality of vehicles for use. The aggregated and verified vehicle data may be more reliable than the vehicle data of a single vehicle alone.

Each vehicle may send all or a sub-set of its vehicle data generated by its sensors. As described in more detail below, the system (e.g., the one or more remote servers 302) compares the vehicle data amongst vehicles having similar vehicle characteristics to determine any errors or discrepancies. The remote server 302 addresses the errors and/or discrepancies to generated verified vehicle data, which can then be transmitted back to the plurality of vehicles for use.

Figure 4:
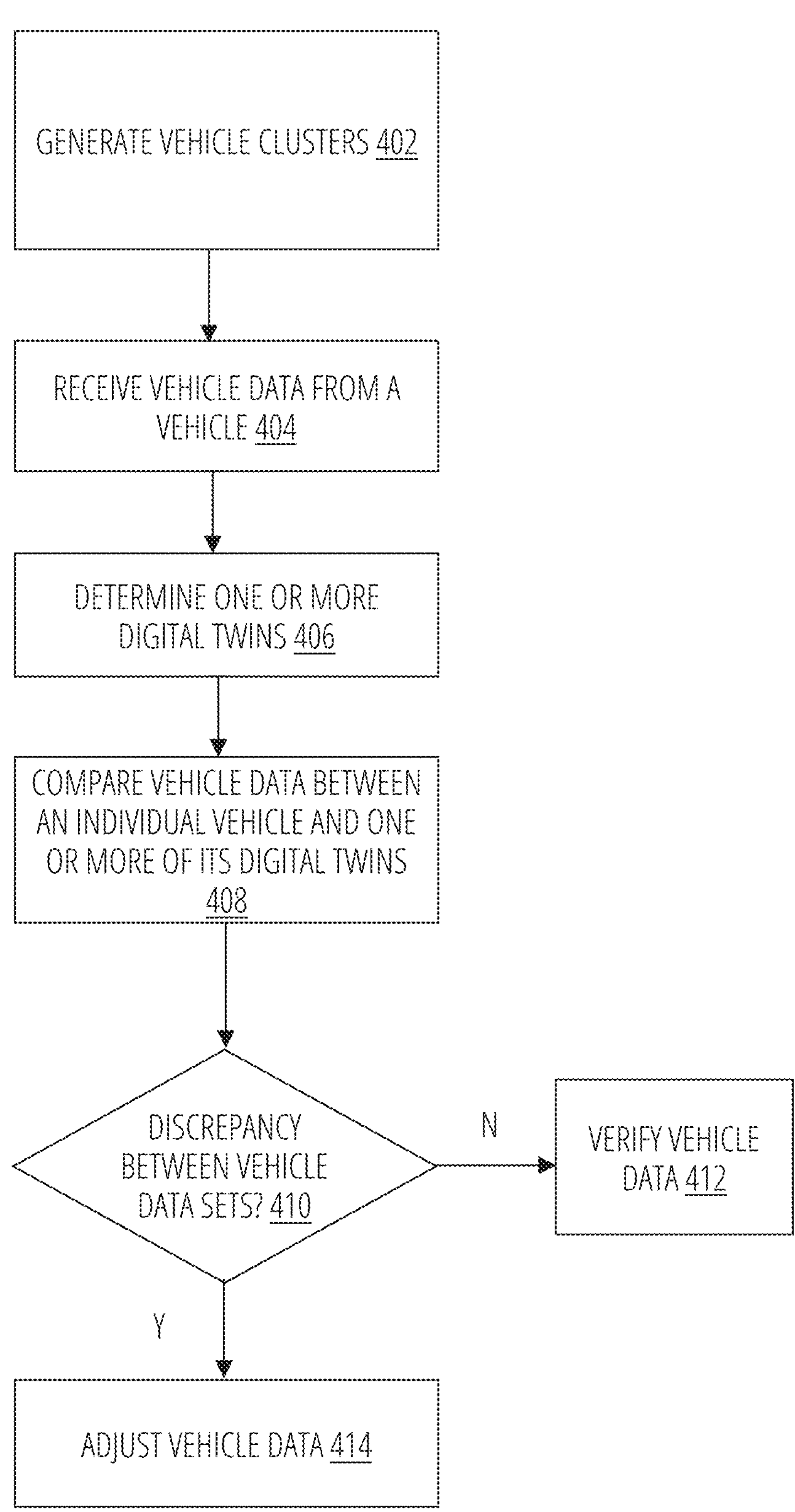
FIG. 4 illustrates a flowchart of an example method for verifying vehicle data according to one or more embodiments described and illustrated herein.

Referring now to FIG. 4, a flowchart of an example method for verifying vehicle data is illustrated. At block 402, clusters of vehicles having similar vehicle characteristics are generated. The vehicle characteristics are not limited by this disclosure. Generally, the similar vehicle characteristics provide vehicles with a close profile, such as having similar data collection capabilities, similar size, similar vehicular purpose (e.g., passenger vehicle versus commercial vehicle) and the like. Vehicles having similar sensor types and capabilities may be clustered together.

Figure 5:
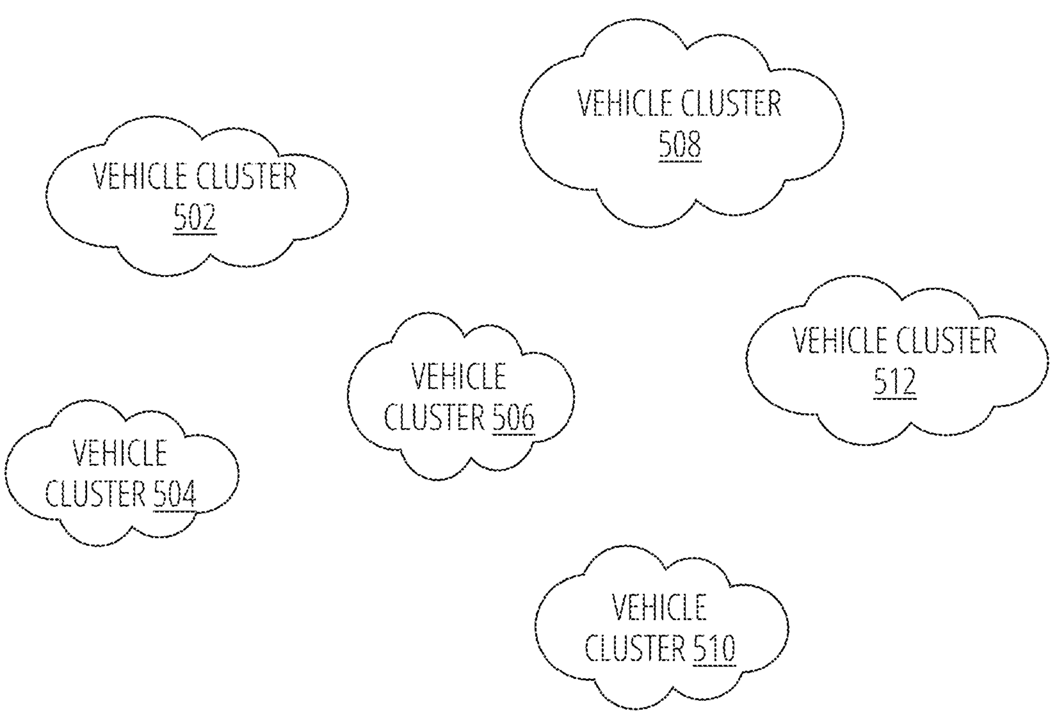
FIG. 5 illustrates an example plurality of vehicle clusters according to one or more embodiments described and illustrated herein.

Referring now to FIG. 5, a plurality of vehicle clusters 502-512 is schematically illustrated. It should be understood that any number of vehicle clusters may be utilized. The vehicle clusters 502-512 include vehicle makes, models, years, trim levels, sensors providing similar sensing capabilities, as described in detail below. Any method of generating the vehicle clusters 502-512 may be utilized. They may be generated manually in some embodiments. In other embodiments, the vehicle clusters 502-512 may be formed by a rules-based approach. In yet other embodiments, a classifier model or clustering algorithm may receive inputs regarding vehicles and their sensing capabilities to generate the plurality of vehicle clusters 502-512.

Referring once again to FIG. 4, at block 404 vehicle data is received from an individual vehicle, such as vehicle 102 of FIG. 1. The vehicle data is generated by one or more vehicle sensors of a vehicle, such as camera sensors, a lidar sensor, a speedometer, and the like. The vehicle data may be transmitted by the vehicle to a computing device for vehicle data verification. In some embodiments, the computing device is a remote server 302, and the vehicle data is transmitted over one or more wireless communication networks as shown in FIG. 3. In other embodiments, the computing device is local to the vehicle such that the vehicle data is verified by the vehicle itself.

At block 406, one or more digital twins for the vehicle 102 sending the vehicle data are determined. As used herein a "digital twin" means another vehicle within the same cluster as the individual vehicle that has traveled within a same geographic region as the individual vehicle and/or traveling within a period time as the individual vehicle. In one non-limiting example, vehicle 102 of FIG. 1 is a 2023 Toyota Camry and assigned to cluster #158. A digital twin for vehicle 102 may be another vehicle within cluster #158 (e.g., a 2022 Toyota Camry) that traveled the same stretch of road within a certain time period (e.g., a time period being less than 20 minutes) as vehicle 102. It would be expected that the digital twin vehicle would have experienced the same environment at the same time as vehicle 102, and thus produce similar vehicle data. The same geographic region may be the same portions of a road, for example. The period of time may be concurrent as the individual vehicle (i.e., both vehicles traveling the same portion of a road at the same time), less than 5 minutes, less than 10 minutes, less than 15 minutes, less than 20 minutes, less than 30 minutes, or less than another duration.

If no digital twins are determined at block 406, the individual vehicle may use the vehicle data that it received without any verification, for example.

Next, at block 408, the vehicle data of the individual vehicle is compared with the vehicle data of the one or more digital twins determined at block 406. For example, speedometer data from the individual vehicle is compared with speedometer data of the one or more digital twins, camera data from the individual vehicle is compared with camera data of the one or more digital twins, and so on.

At block 410 it is determined whether or not there is a discrepancy between the vehicle data of the individual data and the vehicle data of the one or more digital twins. A discrepancy may be indicative of unexpected data that can be the result of an actual road condition (e.g., valid data) or a result of sensor or communication errors (e.g., erroneous data). It may be desirable that the system be able to distinguish between the two categories of data to exclude erroneous data from consideration. Potentially erroneous data is data where the data collected from the individual vehicle and is different according to a predefined metric. Embodiments are not limited by any particular metric. In one non-limiting example, a speed differential between the speed data of the individual vehicle and the speed data of the one or more digital twins that is greater than a threshold is indicative of a discrepancy. Similar metrics may be applied to accelerometer data, wheel position data, brake data, and the like. As another example, one or more object detection algorithms may be utilized to detect objects within camera data of the individual vehicle and the camera data of the one or more digital twins to verify that each are detecting the same objects. If the camera data of the vehicle does not include an object within camera data of the one or more digital twins, then there may be erroneous camera data.

When there is no discrepancy at block 410, the vehicle data generated by the plurality of sensors of the individual vehicle is verified and used to perform any vehicle function at block 412. It is noted that the vehicle data of the individual vehicle may be used as digital twin data for other vehicles.

When there is a discrepancy at block 410, the vehicle data generated by the vehicle is adjusted at block 414. For example, when a discrepancy is identified, the system may compare historical data (e.g., data collected at that location over some duration, such as the past twenty-four hours, for example) to the collected vehicle data to determine which data should be considered valid data. In some examples, when the system identifies multiple digital twins, the data values that are provided by the majority of the digital twins may be considered valid. For example, if two vehicles are traveling in the same segment of a route, in the same lane, over a similar period of time and one of the vehicles measures a momentary drop in speed and the other vehicle does not, the system may flag both data points as possible erroneous. The system may then use historic data to determine which of the two measurements is more likely to be the actual measurement. To handle erroneous data, the system may ignore the vehicle data, immune the correct value from the digital twin(s) and/or infer the correct value by connecting the last known good value to the next known good value. Any method of adjusting the vehicle data may be utilized. In some embodiments, the vehicle data generated by the individual vehicle is eliminated and not utilized.

After the vehicle data has been adjusted, it may be transmitted to the individual vehicle. The individual vehicle may use the adjusted vehicle data to perform vehicle functions, such as, without limitation, autonomous vehicle control.

Figure 6:
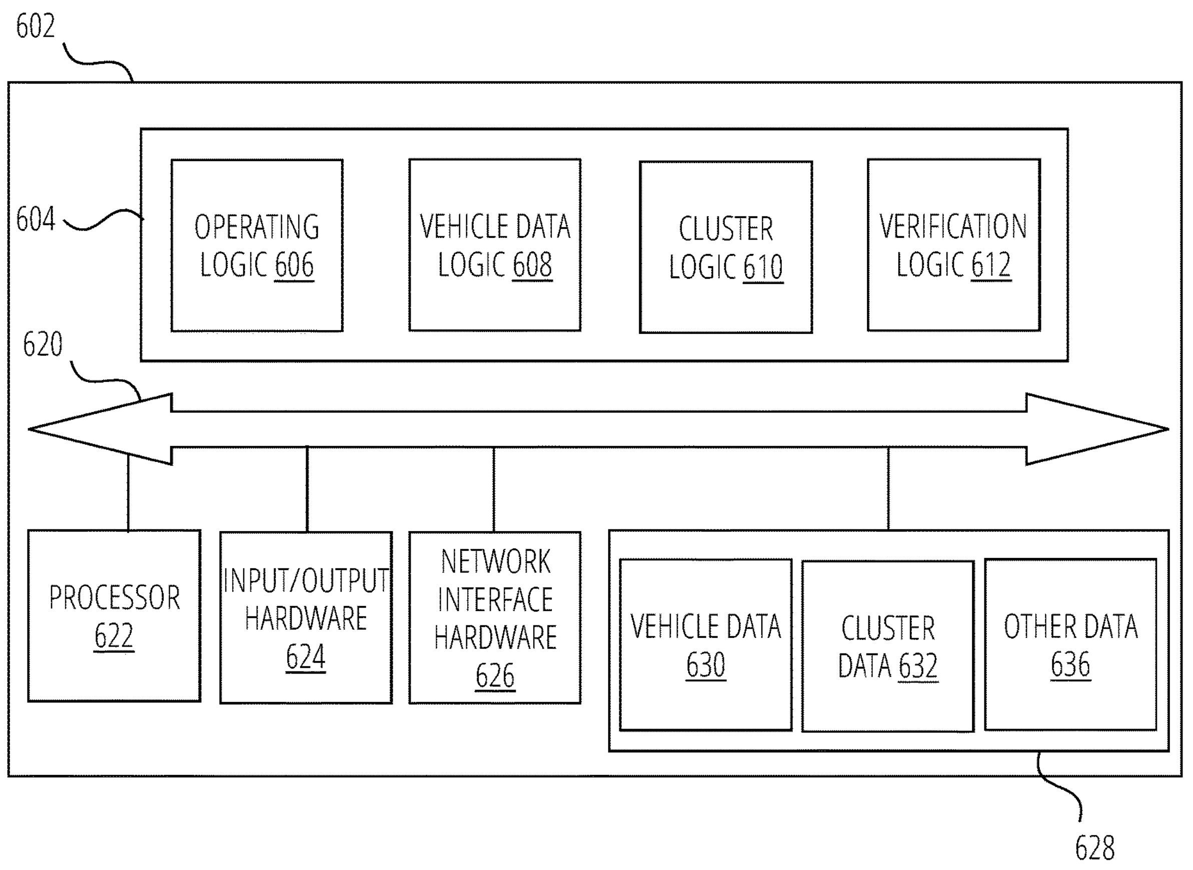
FIG. 6 illustrates an example computing device for verifying vehicle data according to one or more embodiments described and illustrated herein.

Embodiments of the present disclosure may be implemented by a computing device, and may be embodied as computer-readable instructions stored on a non-transitory memory device. Referring now to FIG. 6, an example system for verifying vehicle data. The example computing device 602 provides a system for verifying vehicle data, and/or a non-transitory computer usable medium having computer readable program code for verifying vehicle data embodied as hardware, software, and/or firmware, according to embodiments shown and described herein. While in some embodiments, the computing device 602 may be configured as a general purpose computer with the requisite hardware, software, and/or firmware, in some embodiments, the computing device 602 may be configured as a special purpose computer designed specifically for performing the functionality described herein. The computing device 602 may be a remote server (e.g., the remote server 302 shown in FIG. 3) or it may be a computing device of an individual vehicle. It should be understood that the software, hardware, and/or firmware components depicted in FIG. 6 may also be provided in other computing devices external to the computing device 602 (e.g., data storage devices, remote server computing devices, and the like).

As also illustrated in FIG. 6, the computing device 602 (or other additional computing devices) may include a processor 622, input/output hardware 624, network interface hardware 626, a data storage component 628 (which may include LiDAR and/or vehicle data 630 (e.g., vehicle data generated by an individual vehicle and/or one or more digital twins), cluster data 632 (e.g., data regarding the vehicle clusters), and any other data 636 for performing the functionalities described herein), and a non-transitory memory component 604. The memory component 604 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 604 may be configured to store operating logic 606, vehicle data logic 608 for receiving vehicle data from a plurality of vehicles, cluster logic 610 for generating the plurality of vehicle clusters, and verification logic 612 for verifying vehicle data (each of which may be embodied as computer readable program code, firmware, or hardware, as an example). It should be understood that the data storage component 628 may reside local to and/or remote from the computing device 602, and may be configured to store one or more pieces of data for access by the computing device 602 and/or other components.

A local interface 620 is also included in FIG. 6 and may be implemented as a bus or other interface to facilitate communication among the components of the computing device 602.

The processor 622 may include any processing component configured to receive and execute computer readable code instructions (such as from the data storage component 628 and/or memory component 604). The input/output hardware 624 may include one or more of graphics display device, keyboard, mouse, printer, camera, microphone, speaker, touch-screen, and/or other device for receiving, sending, and/or presenting data. The network interface hardware 626 may include any wired or wireless networking hardware, such as a modem, LAN port, wireless fidelity (Wi-Fi) card, WiMax card, mobile communications hardware, and/or other hardware for communicating with other networks and/or devices. The network interface hardware 626 may communicate via the Internet to receive vehicle data.

Included in the memory component 604 may be the operating logic 606, vehicle data logic 608, cluster logic 610, and verification logic 612. The operating logic 606 may include an operating system and/or other software for managing components of the computing device 602. Similarly, the vehicle data logic 608 may reside in the memory component 604 and may be configured to receive and process vehicle sensor data from a plurality of vehicles. The cluster logic 610 also may reside in the memory component 604 and may be configured to generate vehicle clusters based on vehicle types. The verification logic is configured to compare vehicle data with one or more digital twins and adjust any vehicle data if there is a discrepancy to verify the vehicle data.

The components illustrated in FIG. 6 are merely exemplary and are not intended to limit the scope of this disclosure. More specifically, while the components in FIG. 6 are illustrated as residing within the computing device 602.

It should now be understood that embodiments of the present disclosure are directed to systems and methods for verifying vehicle data generated by the sensors of a vehicle. Embodiments utilize vehicle clusters of similar vehicle types, and compare vehicle data with one or more digital twins within an assigned individual vehicle cluster. Similar vehicle data is ensured by the fact that vehicles within a vehicle cluster have a similar profile and similar capabilities, as well as that a vehicle and its one or more digital twins traverse the same road within a similar period of time. Vehicle data is adjusted when there is a discrepancy between the vehicle data of an individual vehicle and its digital twin(s).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
- clustering a plurality of vehicle types into a plurality of vehicle clusters based at least in part on vehicle capabilities defined by a sensor suite including one or more sensors;
- receiving vehicle data from a plurality of sensors of a vehicle;
- assigning the vehicle to an individual vehicle cluster of the plurality of vehicle clusters;
- determining one or more digital twins also assigned to the individual vehicle cluster;
- comparing the vehicle data of the vehicle with vehicle data associated with the one or more digital twins;
- verifying the vehicle data when there is no discrepancy between the vehicle data of the vehicle and the vehicle data associated with the one or more digital twins; and
- adjusting the vehicle data from the plurality of sensors based on historic data from the one or more digital twins when there is a discrepancy between the vehicle data of the vehicle and the vehicle data associated with the one or more digital twins; and
- operating a vehicle function using the vehicle data.

2. The method of claim 1, wherein the discrepancy is indicative of a sensor error.

3. The method of claim 1, wherein the adjusting of the vehicle data of the vehicle comprises correcting the vehicle data of the vehicle.

4. The method of claim 1, wherein the adjusting of the vehicle data of the vehicle comprises deleting the vehicle data of the vehicle.

5. The method of claim 1, wherein the one or more digital twins are based at least in part on a shared geographic area with the vehicle.

6. The method of claim 1, wherein the one or more digital twins are based at least in part on a period of time.

7. A method comprising:
- receiving, by a computing device, vehicle data generated by a plurality of sensors of a vehicle;
- verifying, by the computing device, the vehicle data by comparing the vehicle data with vehicle data associated with one or more digital twins assigned to a same vehicle cluster as the vehicle, wherein the one or more digital twins and the vehicle have similar vehicle capabilities based on vehicle data generated by a sensor suite;
- adjusting the vehicle data from the plurality of sensors based on historic data from the one or more digital twins when there is a discrepancy between the vehicle data of the vehicle and the vehicle data associated with the one or more digital twins; and
- autonomously controlling at least one vehicle function of the vehicle based on the verified vehicle data.

8. The method of claim 7, wherein the computing device verifies the vehicle data when there is no discrepancy between the vehicle data of the vehicle and the vehicle data associated with the one or more digital twins, and the computing device adjusts the vehicle data when there is a discrepancy between the vehicle data of the vehicle and the vehicle data associated with the one or more digital twins.

9. The method of claim 7, wherein the adjusting of the vehicle data of the vehicle comprises correcting the vehicle data of the vehicle.

10. The method of claim 9, wherein the adjusting of the vehicle data of the vehicle comprises deleting the vehicle data of the vehicle.

11. The method of claim 7, wherein the one or more digital twins are based at least in part on a shared geographic area with the vehicle.

12. The method of claim 7, wherein the one or more digital twins are based at least in part on a period of time.

13. A system comprising:
- one or more processors; and
- a non-transitory computer-readable memory storing instructions that, when executed by the one or more processors, causes the one or more processors to:
- cluster a plurality of vehicle types into a plurality of vehicle clusters based at least in part on vehicle capabilities defined by a sensor suite including on one or more sensors;
- receive vehicle data from a plurality of sensors of a vehicle;
- assign the vehicle to an individual vehicle cluster of the plurality of vehicle clusters;
- determine one or more digital twins also assigned to the individual vehicle cluster;

compare the vehicle data of the vehicle with vehicle data associated with the one or more digital twins;

verify the vehicle data from the plurality of sensors when there is no discrepancy between the vehicle data of the vehicle and the vehicle data associated with the one or more digital twins;

adjust the vehicle data based on historic data from the one or more digital twins when there is a discrepancy between the vehicle data of the vehicle and the vehicle data associated with the one or more digital twins and operate a vehicle function using the vehicle data.

14. The system of claim 13, wherein the discrepancy is indicative of a sensor error.

15. The system of claim 13, wherein the one or more digital twins are based at least in part on a shared geographic area with the vehicle.

16. The system of claim 13, wherein the one or more digital twins are based at least in part on a period of time.

* * * * *